UNITED STATES PATENT OFFICE.

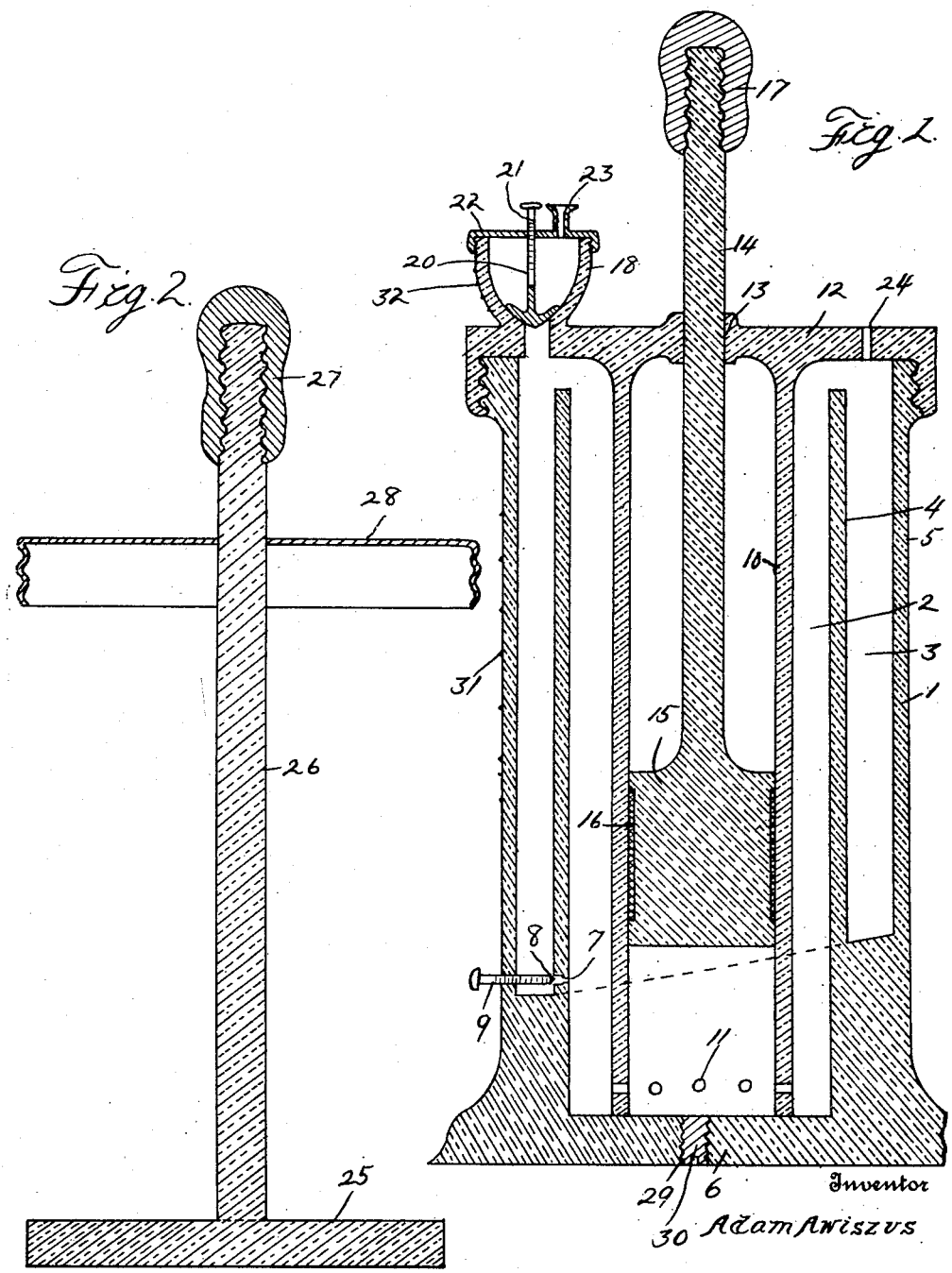

ADAM AWISZUS, OF DETROIT, MICHIGAN.

MIXING DEVICE.

1,367,002. Specification of Letters Patent. Patented Feb. 1, 1921.

Application filed August 30, 1920. Serial No. 406,863.

*To all whom it may concern:*

Be it known that I, ADAM AWISZUS, a citizen of the Republic of Lithuania, residing at Detroit, in the county of Wayne and State of Michigan, have invented certain new and useful Improvements in Mixing Devices, of which the following is a specification, reference being had therein to the accompanying drawings.

The invention relates to mixing devices and has for its object the provision of a simple construction which will facilitate mixing of different ingredients. With this object in view the invention resides in the novel features of construction and combination of parts as more fully hereinafter set forth.

In the drawings:

Figure 1 is a central section through a mixing device embodying my invention;

Fig. 2 is a side elevation of a plunger adapted to be used with the mixing device.

1 is a receptacle, preferably formed of glass, and having the inner and outer concentric chambers 2 and 3 respectively, which are formed by means of the spaced concentric annular walls 4 and 5 extending upwardly from the base 6. The bottom of the outer chamber 3 preferably slopes downwardly toward the opening 7 in the inner wall 4, and for closing this aperture there is a valve 8, which is adjustable into and out of engagement with its seat by means of the threaded stem 9 extending through the outer wall 5.

10 is a cylindrical member, preferably formed of glass, and having its lower end adapted to rest upon the bottom of the receptacle 1. 11 are apertures at the lower end of the cylinder for placing the interiors of the chamber 2 and cylinder 10 in communication with each other. 12 is a cover, also preferably formed of glass, and furthermore integral with the cylinder 10, which cover is adapted to threadedly engage the outer wall 5 of the receptacle 1. This cover is provided with the centrally located aperture 13 therethrough, within which slidably fits the stem 14 of the plunger 15, which latter is adapted to slidably engage in the cylinder 10. Suitable packing 16 is provided in the periphery of the plunger 15 for sealing the joint between the plunger and the cylinder. This plunger and its stem are also preferably formed of glass.

For the purpose of permitting of the removal of the plunger 15 from the cylinder 10, the outer end of the plunger 14 is made threaded and is adapted to be detachably engaged by means of the handle 17, which may also be formed of glass.

18 is a receptacle, preferably integral with the cover 12, and communicating with the outer chamber 3 by means of the passageway 19 through the cover. This passageway is controlled by the valve 20, which is movable toward and away from its seat by the threaded stem 21, threadedly engaging the cover 22, which in turn threadedly engages the receptacle 18. 23 is a spout in the cover 22 for permitting of the insertion of the desired ingredients into the receptacle 18.

In operation, when the device is used for mixing ingredients to make a food, such as mayonnaise, the desired number of yolks of eggs are placed in the inner chamber 2 of the receptacle 1 and oil is placed in the outer chamber 3. Furthermore, vinegar with salt and pepper is inserted into the receptacle 18. By reciprocating the plunger 15 within the cylinder 10, the yolks of eggs are alternatively drawn into and forced out of the cylinder 10 through the apertures 11, and are mixed with the oil, which is permitted to enter through the aperture 7, and also with the mixture of vinegar, salt and pepper. This latter mixture being heavier than oil, will gravitate to the bottom of the outer chamber 3 and since the latter is sloped toward the aperture 7, the mixture can pass through the aperture, even if oil is still contained in the chamber 3. The sloping of the bottom of the chamber 3 is essential, since the position of the receptacle 18 may be readily varied, depending upon the distance the cover 12 is screwed upon the receptacle 1. Passage of air is permitted into and out of the chamber 2 during the reciprocation of the plunger 15 by reason of the fact that the cover 12 has the aperture 24 therethrough and the upper end of the inner wall 4 is placed below and out of contact with the cover.

After the mixing operation has been performed, the mixture can be removed by means of the plunger 25 having the stem 26, at the outer end of which is the handle 27. The stem 26 passes through the cover 28, which may replace the cover 12, and when in place upon the receptacle 1, the plunger 25 slidably engages the inner wall 4 of the receptacle, so that upon forcing inward of the plunger the mixture can be forced out through the aperture 29 in the bottom of the receptacle 1, which normally is filled by means of the plug 30 threadedly engaging in the aperture.

To assist in determining the proper amounts of ingredients in the outer chamber 3 and receptacle 18 which are to be mixed in the chamber 2, the outer wall 5 of the receptacle 1 has suitable graduations 31 thereon and the wall of the receptacle 18 has suitable graduations 32 thereon.

From the above description it will be readily seen that I have provided a simple construction of mixer which comprises but few parts that can be easily cleaned and which is efficient in operation and can be controlled to mix the proper amounts of ingredients together. Furthermore, the receptacle is adapted to interchangeably receive the mixing structure or the ejecting structure.

What I claim as my invention is:

1. In a mixing device, the combination with a receptacle having inner and outer chambers adapted to communicate with each other, of a cylinder extending longitudinally within the inner of said chambers and communicating therewith near its lower end, and a plunger slidably mounted in said cylinder.

2. In a mixing device, the combination with a receptacle having concentric inner and outer chambers adapted to communicate with each other, of a cover removably engaging the upper end of said receptacle, a cylinder secured to said cover and extending longitudinally within the inner chamber of said receptacle, said cylinder communicating therewith through apertures near its lower end, and a plunger slidably engaging in said cylinder and having a stem slidably engaging in said cover.

3. In a mixing device, the combination with a receptacle having an inner chamber and an outer concentric chamber formed by concentric annular walls, an aperture through the inner wall for placing said outer chamber in communication with said inner chamber, means for closing said aperture, a cover threadedly engaging the upper end of said outer wall, a cylinder secured to said cover and extending longitudinally within the inner chamber and communicating therewith near its bottom, a plunger longitudinally slidably engaging in said cylinder and having a stem extending through said cover, and a receptacle upon said cover adapted to communicate with the outer chamber.

4. In a mixing device, the combination with a receptacle having inner and outer chambers formed by concentric walls, the inner wall having an aperture therethrough for placing the outer chamber in communication with the inner chamber, the bottom of said outer chamber sloping toward said aperture, a cover threadedly engaging the upper end of the outer wall, a cylinder secured to said cover and extending longitudinally within the inner chamber and communicating therewith near its lower end, a plunger longitudinally slidably engaging in said cylinder, and a receptacle upon said cover adapted to communicate with the outer chamber.

5. In a mixing device, the combination with a transparent receptacle having inner and outer walls forming inner and outer chambers and a valve controlled passageway through said inner wall, of a cylinder extending within said inner chamber, a plunger slidably mounted in said cylinder, and a series of graduations on said outer wall.

6. In a mixing device, the combination with a receptacle having an apertured base and inner and outer chambers adapted to communicate with each other, of a cover removably secured to said receptacle, a cylinder upon said cover extending within said inner chamber, and a plunger slidably engaging within said cylinder, and an ejecting structure comprising a cover interchangeably removably secured to said receptacle and a plunger slidably engaging said inner wall.

7. In a mixing device, the combination with a receptacle having inner and outer walls forming inner and outer chambers, said inner wall having a passageway therethrough, of a cylinder extending longitudinally within the inner chamber and communicating therewith near its lower end, said cylinder being secured to one of said walls, and a plunger slidably mounted in said cylinder.

In testimony whereof I affix my signature.

ADAM AWISZUS.

Witnesses:
D. L. NEWLANDS,
FREDERICK G. NAGLE.